United States Patent
Chikamori et al.

(10) Patent No.: US 10,586,962 B2
(45) Date of Patent: Mar. 10, 2020

(54) ON-BOARD DEVICE, DISPLAY DEVICE, AND METHOD FOR DETECTING PARKING BRAKE RELEASE

(71) Applicant: MITSUBISHI ELECTRIC CORPORATION, Chiyoda-ku, Tokyo (JP)

(72) Inventors: Masahiro Chikamori, Tokyo (JP); Shingo Hamada, Tokyo (JP); Ryousuke Okada, Tokyo (JP); Takashi Miyauchi, Tokyo (JP); Tomoaki Ikejima, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/090,398

(22) PCT Filed: Apr. 19, 2016

(86) PCT No.: PCT/JP2016/062406
§ 371 (c)(1),
(2) Date: Oct. 1, 2018

(87) PCT Pub. No.: WO2017/183111
PCT Pub. Date: Oct. 26, 2017

(65) Prior Publication Data
US 2019/0115575 A1    Apr. 18, 2019

(51) Int. Cl.
*H02P 1/00* (2006.01)
*H01M 2/10* (2006.01)
(Continued)

(52) U.S. Cl.
CPC .......... *H01M 2/1083* (2013.01); *B60L 3/00* (2013.01); *B60T 17/228* (2013.01)

(58) Field of Classification Search
CPC ................................ B60L 3/00; B60T 17/228
See application file for complete search history.

(56) References Cited

U.S. PATENT DOCUMENTS

2018/0029573 A1* 2/2018 Englert ................. B60T 13/686

FOREIGN PATENT DOCUMENTS

JP         2007015517 A         1/2007

OTHER PUBLICATIONS

International Search Report (PCT/ISA/210) dated Jul. 19, 2016, by the Japan Patent Office as the International Searching Authority for International Application No. PCT/JP2016/062406.
(Continued)

*Primary Examiner* — Karen Masih
(74) *Attorney, Agent, or Firm* — Buchanan Ingersoll & Rooney PC (57) ABSTRACT

An on-board device is mounted on a train having a battery capable of supplying power when a vehicle power supply is off, a parking brake to fix a wheel when the train is stopped, and a parking-brake controlling electromagnetic valve to be energized by power supplied from the battery when the parking brake is released, and even when the vehicle power supply is off, retains position information of the train stored when the vehicle power supply is on. The on-board device includes a parking-brake release detecting circuit that has a parking-brake-controlling-electromagnetic-valve energization detecting unit to detect energization to the parking-brake controlling electromagnetic valve when the vehicle power supply is off, and a parking-brake-controlling-electromagnetic-valve energization detection storage unit to store therein a result of detection until stored contents are reset.

4 Claims, 6 Drawing Sheets

(51) Int. Cl.
*B60L 3/00* (2019.01)
*B60T 17/22* (2006.01)

(56) References Cited

OTHER PUBLICATIONS

Written Opinion (PCT/ISA/237) dated Jul. 19, 2016, by the Japan Patent Office as the International Searching Authority for International Application No. PCT/JP2016/062406.

* cited by examiner

ON-BOARD DEVICE, DISPLAY DEVICE, AND METHOD FOR DETECTING PARKING BRAKE RELEASE

FIELD

The present invention relates to an on-board device of a train and a method for detecting parking brake release that detects whether a parking brake of this train is released or not.

BACKGROUND

In a train radio system in which an operation of a train is controlled by communication between an on-board device of the train and a ground device, it is required that the on-board device detects the position of the train and the position of the train in an area is managed. When some trouble occurs in an operation of a train, the train cannot be displaced to a rail yard, and so the train sometimes has to be retained or stayed overnight on a railway track. However, when movement due to wandering or rolling motion occurs during retainment or overnight stay of the train, the train moves in a condition in which a power source of on-board devices of the train is turned off, thereby making a difference between position information stored in the on-board device of the train before the power source of the on-board device is turned off and an actual on-rail position of the train. It is noted that the wandering motion means movement of a stopped vehicle in which a vehicle power supply is turned off, which is caused by the vehicle allowed to move because an on-rail position of the train is on a slope, and the rolling motion means movement of a stopped vehicle in which a vehicle power supply is turned off, which is caused by the vehicle allowed to move due to a problem on how brakes have been put thereon. If an operation of a train is started in such a situation that the position information stored in the on-board device of the train and the actual on-rail position of the train are different from each other as described above, the on-board device cannot recognize an accurate distance between its own train on which the on-board device is mounted and another train, so that the train radio system cannot be operated satisfactorily. This problem may also occur not only in a case of the wandering or rolling motion but also in a case where a train is hauled to be displaced. Haul/hauling means to move a vehicle whose vehicle power supply is turned off, by pulling the vehicle using another vehicle.

Patent Literature 1 that is an example of a conventional technique discloses a train management system in which a train on a railroad in each of sections obtained by dividing a rail track into parts is managed on a ground side based on train identification information transmitted from a train ID oscillator mounted on the train, and a boundary between the sections is provided with an ID detecting device that detects the train identification information. According to the technique of Patent Literature 1, the train ID oscillator and the ID detecting device constantly perform communication with each other, so that an accurate on-rail position of the train can be recognized.

CITATION LIST

Patent Literature

Patent Literature 1: Japanese Patent Application Laid-open No. 2007-15517

SUMMARY

Technical Problem

However, according to the conventional technique described above, a train requires a train ID oscillator that constantly transmits the position of the train to the ground side, and the ground side requires an ID detecting device that performs transmission and reception of train identification information with the train ID oscillator. For this reason, there has been a problem in that cost is increased for a facility for constantly performing communication.

The present invention has been made in view of the above circumstances, and an object of the present invention is to provide an on-board device that can detect movement of a train whose vehicle power supply is turned off, while suppressing an increase in cost.

Solution to Problem

In order to solve the above-mentioned problems and achieve the object, the present invention provides an on-board device that is equipped in a train having a battery capable of supplying electric power when a vehicle power supply is off, a parking brake to fix a wheel when the train is stopped, and a parking-brake controlling electromagnetic valve to be energized by power supplied from the battery when the parking brake is released, and that retains position information of the train stored when the vehicle power supply is on, even when the vehicle power supply is off, the on-board device comprising a parking-brake release detecting circuit that includes: a parking-brake-controlling-electromagnetic-valve energization detection unit to detect energization to the parking-brake controlling electromagnetic valve when the vehicle power supply is off; and a parking-brake-controlling-electromagnetic-valve energization detection storage unit to store therein a result of detection until stored contents are reset.

Advantageous Effects of Invention

According to the present invention, an advantageous effect is exerted in that movement of a train with a vehicle power supply off can be detected, while cost increase is minimized.

DESCRIPTION OF EMBODIMENTS

An on-board device, a display device, and a method for detecting parking brake release according to an embodiment of the present invention will be described in detail below with reference to the drawings. The present invention is not necessarily limited to the embodiment.

Embodiment

Figure 1:
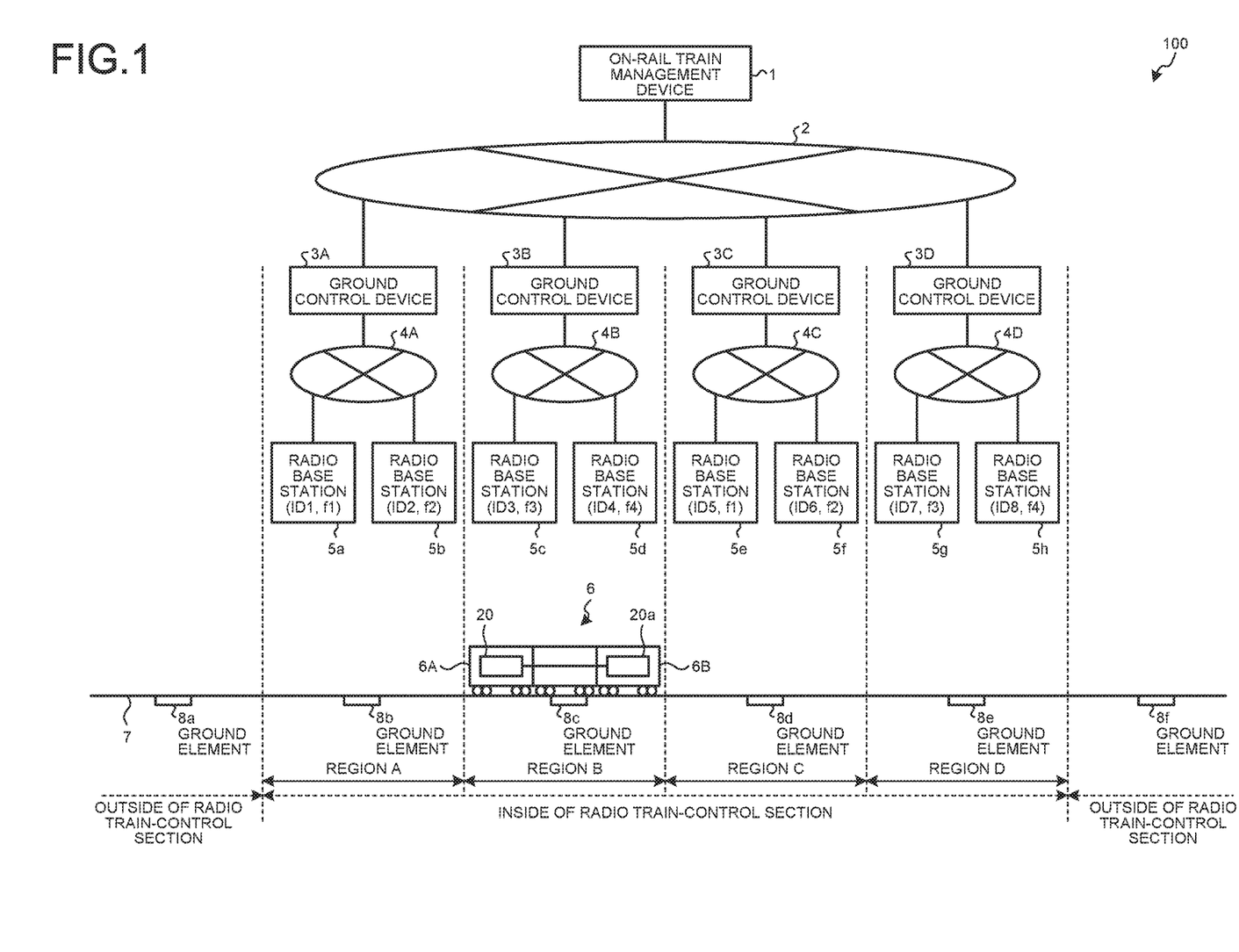
FIG. 1 is a diagram illustrating a configuration of a train control system according to an embodiment.

FIG. 1 is a diagram illustrating a configuration of a train control system according to an embodiment of the present invention. FIG. 1 illustrates an on-rail train management device 1, a train radio system network 2, ground control devices 3A, 3B, 3C, and 3D, base networks 4A, 4B, 4C, and 4D, radio base stations 5a, 5b, 5c, 5d, 5e, 5f, 5g, and 5h, a train 6, a track 7, and ground elements 8a, 8b, 8c, 8d, 8e, and 8f.

The on-rail train management device 1 manages IDs of on-board devices 20 and 20a of the train 6 in a train radio system 100. The on-rail train management device 1 also performs backup of the ground control devices 3A, 3B, 3C, and 3D, and is used when the ground control device 3A, 3B, 3C, or 3D breaks down and restart is performed. The train radio system network 2 is a network for the entire radio train-control section and connects the on-rail train management device 1 and the ground control devices 3A, 3B, 3C, and 3D.

Each of the ground control devices 3A, 3B, 3C, and 3D is provided in a corresponding region. The ground control devices 3A, 3B, 3C, and 3D are each a device configured to track the position of the train 6, adjust the distance between trains, and control an operation of the trains based on position information received from the on-board device 20 provided in the train 6 in each region. The ground control devices 3A, 3B, 3C, and 3D each include a base terminal and a base device. It is noted that the position information is information indicating an on-rail position of the train 6, and is obtained by the train 6 acquiring an absolute position by a ground element and calculating a relative position from the ground element based on velocity information from a velocity sensor (not illustrated).

The base networks 4A, 4B, 4C, and 4D are each a network provided for each base, and connect the base devices included in the ground control devices 3A, 3B, 3C, and 3D and the radio base stations 5a, 5b, 5c, 5d, 5e, 5f, 5g, and 5h. A hand-over point of each radio base station 5a, 5b, 5c, 5d, 5e, 5f, 5g, or 5h is managed by any of the ground control devices 3A, 3B, 3C, and 3D. The train 6 connects with any of the radio base stations 5a, 5b, 5c, 5d, 5e, 5f, 5g, and 5h with which the train 6 is connected depending on the on-rail position thereof. In a case where the train 6 fails to connect with an appropriated radio base station to connect and information of the on-board device 20 received by the ground control device 3A, 3B, 3C, or 3D passes through a radio base station other than a determined radio base station, the ground control devices 3A, 3B, 3C, and 3D do not transmit a message for controlling a train to the train which has failed to connect with the appropriate radio base station to connect.

The track 7 is a track on which the train 6 travels, and is roughly classified into inside of a radio train-control section and outside of the radio train-control section. That is, the track 7 is a track that has a radio train-control section as a part thereof. Inside the radio train-control section, an operation of the train 6 is controlled by the train radio system illustrated in FIG. 1. Outside the radio train-control section, the operation of the train 6 is controlled by a means other than the train radio system, such as a track circuit.

Note that the ground elements 8a, 8b, 8c, 8d, 8e, and 8f that are position-correction ground elements are installed on the track 7. In FIG. 1, the ground elements 8b, 8c, 8d, and 8e are arranged in regions A, B, C, and D, respectively. The ground element 8a is disposed outside the radio train-control section on the side of the region A, and the ground element 8f is disposed outside the radio train-control section on the side of the region D. While one ground element is installed in one region in FIG. 1, arrangement of the ground elements is not limited to this one-by-one formation, and two or more ground elements may be installed in one region.

The radio base stations 5a, 5b, 5c, 5d, 5e, 5f, 5g, and 5h communicate with the on-board device 20 provided in the train 6. ID1, ID2, ID3, ID4, ID5, ID6, ID7, and ID8 that are unique IDs are assigned to the radio base stations 5a, 5b, 5c, 5d, 5e, 5f, 5g, and 5h, respectively. Frequencies used for communication by the radio base stations 5a, 5b, 5c, 5d, 5e, 5f, 5g, and 5h are fixed, and the frequencies differ from each other between adjacent ones of the radio base stations 5a, 5b, 5c, 5d, 5e, 5f, 5g, and 5h.

In FIG. 1, four frequencies f1, f2, f3, and f4 are exemplified as the frequencies used for communication by the radio base stations 5a, 5b, 5c, 5d, 5e, 5f, 5g, and 5h. The frequencies f1, f2, f3, and f4 are assigned to the radio base stations 5a, 5b, 5c, and 5d in this order respectively, and the frequencies f1, f2, f3, and f4 are assigned to the radio base stations 5e, 5f, 5g, and 5h in this order, respectively. The frequencies f1, f2, f3, and f4 are different from one another.

The train 6 includes a vehicle 6A and a vehicle 6B on both ends thereof. The vehicle 6A has the on-board device 20, and the vehicle 6B has the on-board device 20a. The on-board device 20 and the on-board device 20a can communicate with each other via a communication line. When the train 6 travels from the region A side to the region D side, the vehicle 6B is a lead vehicle and the vehicle 6A is a trailing vehicle. When the train 6 travels from the side of the region D to the side of the region A, the vehicle 6A is a lead vehicle and the vehicle 6B is a trailing vehicle.

The train 6 includes a plurality of wheels. The wheels are locked by a parking brake at the time of stoppage of the train 6. In a state where the parking brake is not released, the train 6 cannot be moved.

Figure 2:
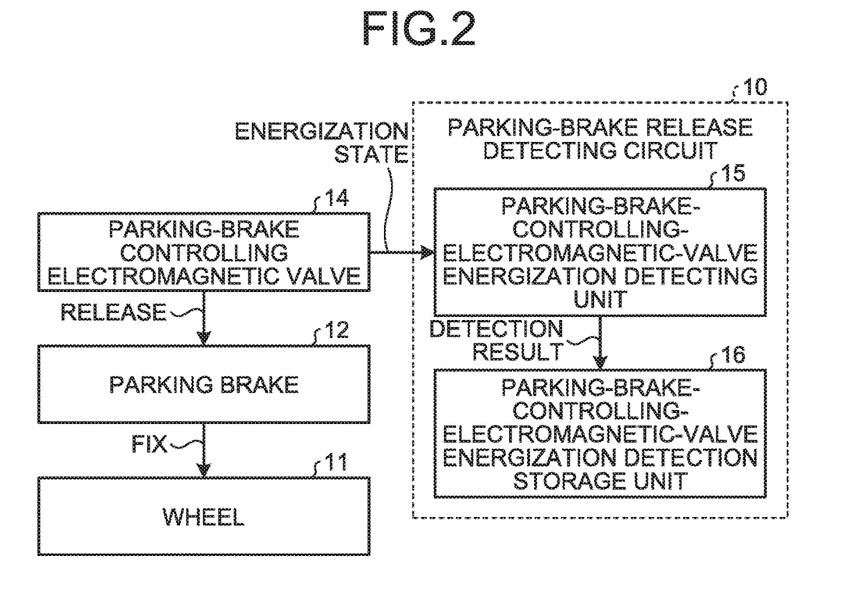
FIG. 2 is a block diagram illustrating a configuration of a parking-brake release detecting circuit included in an on-board device, a parking brake of which release is detected by the parking-brake release detecting circuit, and a peripheral parts of the circuit and brake in the embodiment.

FIG. 2 is a block diagram illustrating a configuration of a parking-brake release detecting circuit 10 included in each of the on-board devices 20 and 20a, a parking brake 12 of which release is detected by the parking-brake release detecting circuit 10, and peripheral parts thereof in the present embodiment. The parking brake 12 illustrated in FIG. 2 fixes a wheel 11 at the time of stoppage of the train 6, and is released at the time of displacement of the train 6. Unless the parking brake 12 is released, the wheel 11 remains fixed. A semilunar shoe in the form of a half moon, fixed to a spring, is exemplified as the parking brake 12. At the time of parking, the semilunar shoe presses against the wheel 11 by a restoring force of the spring, thereby to fix the wheel 11. At the time of traveling, a parking-brake controlling electromagnetic valve 14 is opened to allow the spring to be compressed to release the parking brake 12 based on main reserved air pressure, that is, by being supplied with high-pressure air. The parking-brake controlling electromagnetic valve 14 controls fixing and releasing of the wheel 11 using the parking brake 12. In other words, the parking brake 12 fixes the wheel 11 when the parking-brake controlling electromagnetic valve 14 is closed, but the parking brake 12 is released when the parking-brake controlling electromagnetic valve 14 is opened.

The parking-brake release detecting circuit 10 detects an electrically energized state of the parking-brake controlling electromagnetic valve 14 to sense release of the parking brake 12. The parking-brake release detecting circuit 10 includes a parking-brake-controlling-electromagnetic-valve energization detecting unit 15 that detects energization of the parking-brake controlling electromagnetic valve 14 when a vehicle power supply is off, and a parking-brake-controlling-electromagnetic-valve energization detection storage unit 16 that stores a detection result of the parking-brake-controlling-electromagnetic-valve energization detecting unit 15 until stored contents are reset. The vehicle power supply is a power supply that is supplied from an overhead contact line via a power-supply device (not illustrated) when a pantograph (not illustrated) is lifted up, which supplies power to a vehicle-information management device and an on-board power-supply device and charges a battery 25.

It suffices that the parking-brake-controlling-electromagnetic-valve energization detecting unit 15 can detect occurrence of energization of the parking-brake controlling electromagnetic valve 14 at least once. Further, the parking-brake-controlling-electromagnetic-valve energization detection storage unit 16 can retain its memory even while the vehicle power supply is off. When the vehicle power supply is turned on, power is supplied to an on-board control device 30 and the parking-brake-controlling-electromagnetic-valve energization detection storage unit 16 reads the stored contents of the on-board control device 30, and thereafter, the parking-brake-controlling-electromagnetic-valve energization detection storage unit 16 stores a result of detection of the parking-brake-controlling-electromagnetic-valve energization detecting unit 15 until the stored contents are reset. The parking-brake-controlling-electromagnetic-valve energization detection storage unit 16 is realized by a magnetic stick relay as an example.

Figure 3:
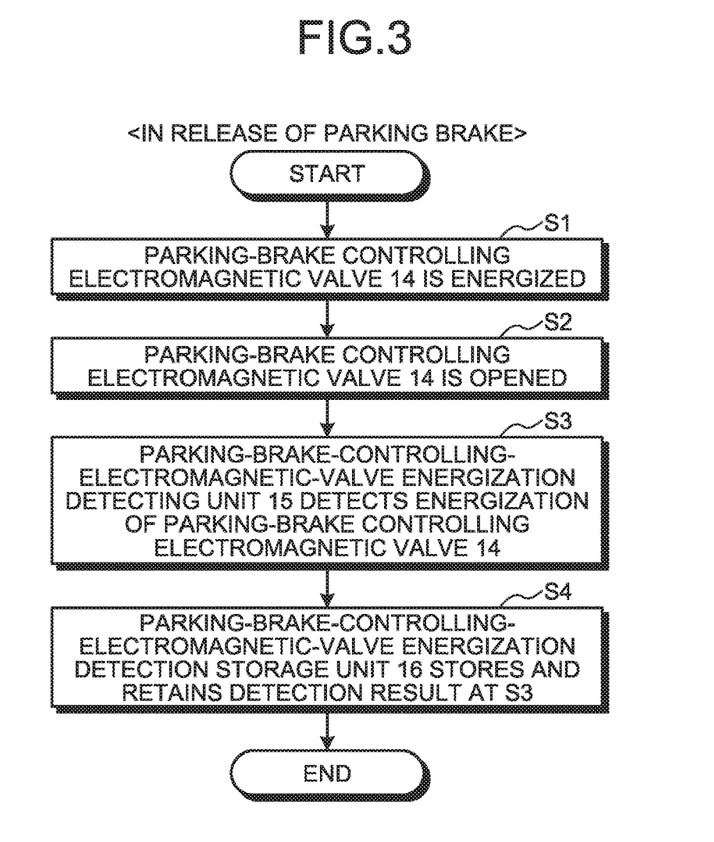
FIG. 3 is a flowchart illustrating operations of the parking brake and the parking-brake release detecting circuit illustrated in FIG. 2 when the parking brake is released.

FIG. 3 is a flowchart illustrating operations of the parking brake and parking-brake release detecting circuit illustrated in FIG. 2 when the parking brake is released. In a case where a train is moved due to wandering or rolling motion, or is hauled while a vehicle power supply is off, when a breaker is operated to electrically energize the parking-brake controlling electromagnetic valve 14 (S1), the parking-brake controlling electromagnetic valve 14 is opened (S2). Then, when the parking-brake controlling electromagnetic valve 14 is opened, the parking brake 12 is released, and the parking-brake-controlling-electromagnetic-valve energization detecting unit 15 detects electrical energization of the parking-brake controlling electromagnetic valve 14 (S3). The parking-brake-controlling-electromagnetic-valve energization detection storage unit 16 stores a result of the detection of the parking-brake-controlling-electromagnetic-valve energization detecting unit 15, and retains it until the stored content is reset (S4).

Figure 4:
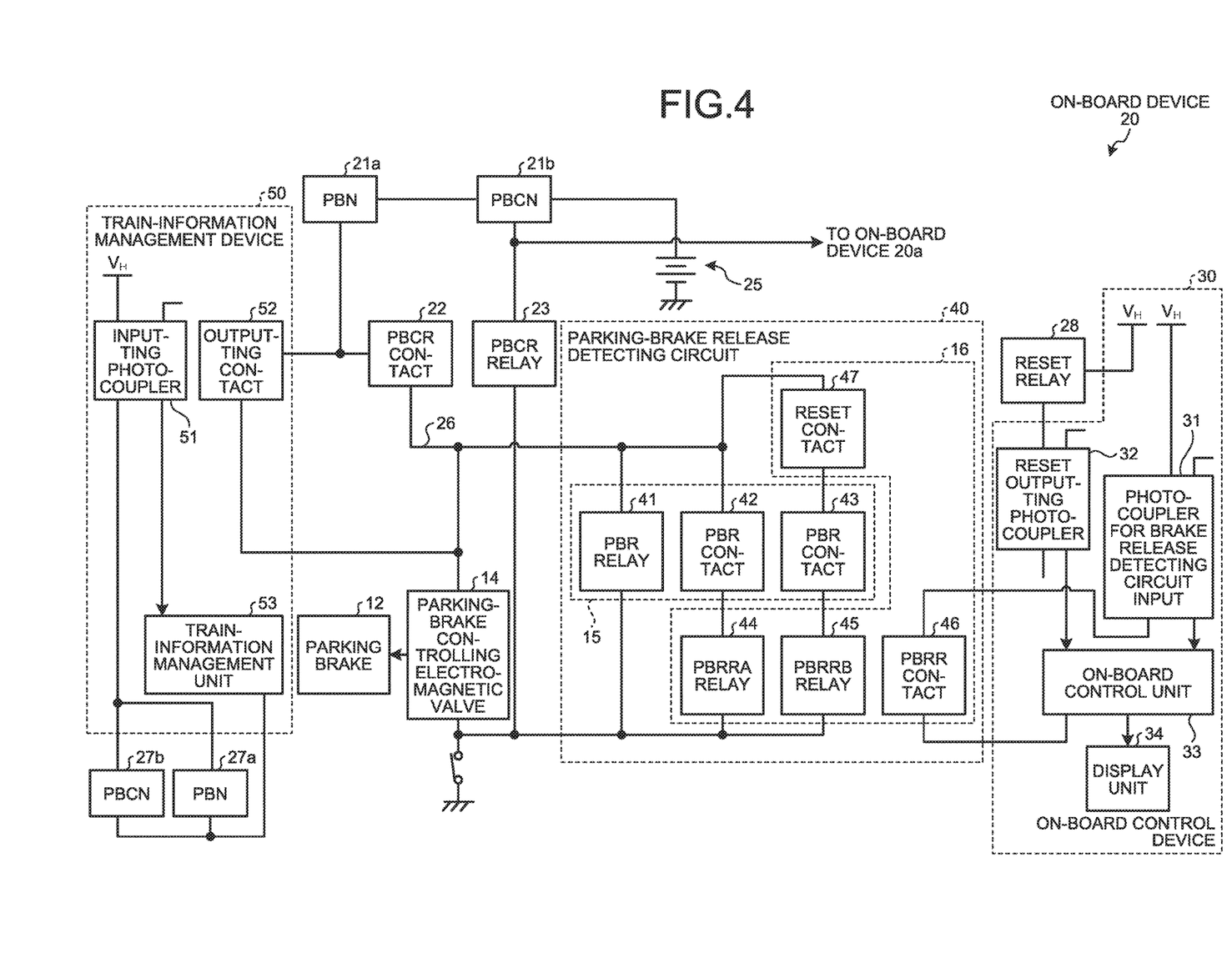
FIG. 4 is a block diagram illustrating an example of the configuration of the on-board device in the embodiment.
Figure 5:
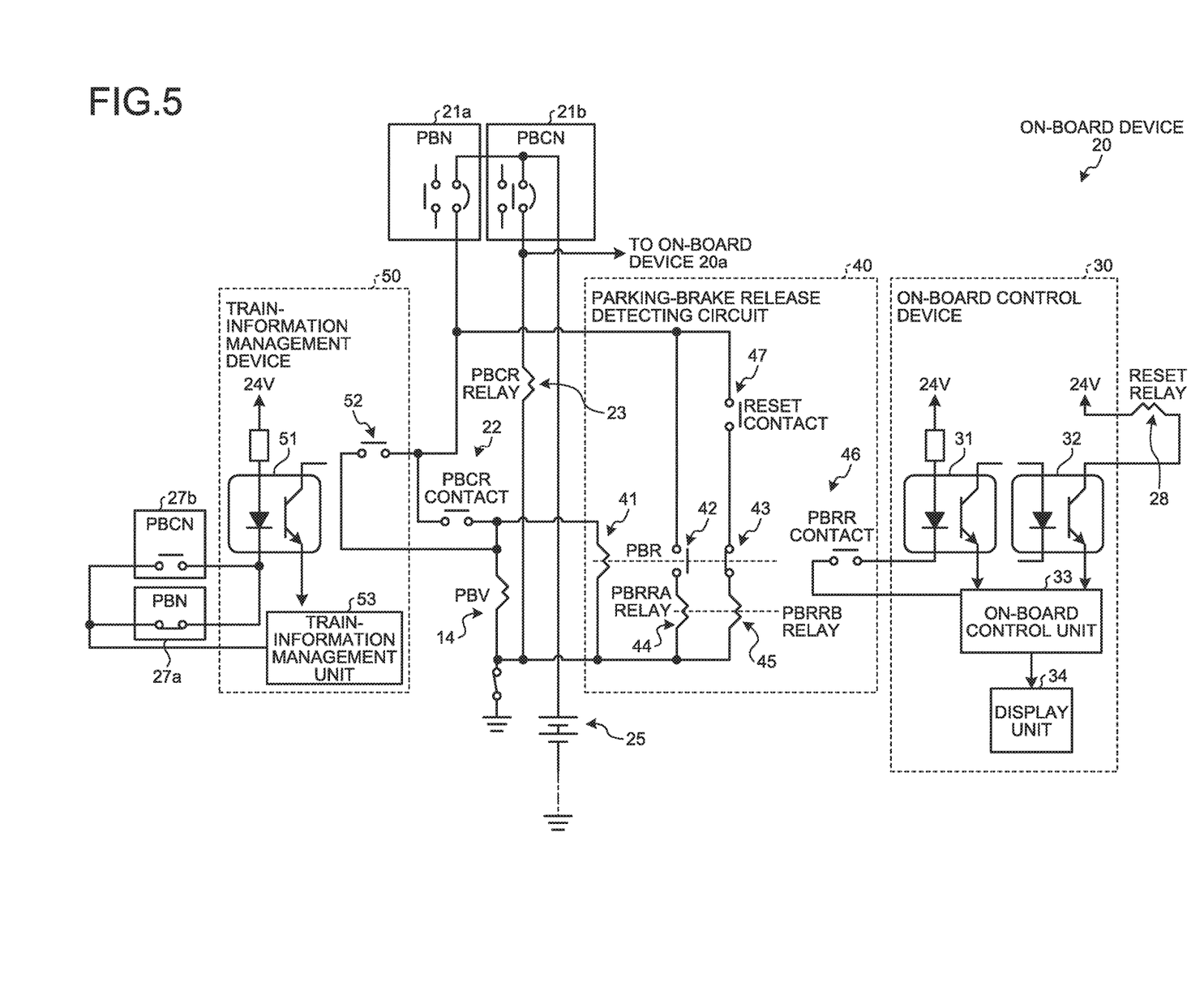
FIG. 5 is a circuit diagram illustrating an example of the configuration of the on-board device in the embodiment.

FIG. 4 is a block diagram illustrating an example of a configuration of the on-board device 20 in the embodiment of the present invention. FIG. 5 is a circuit diagram illustrating an example of the configuration of the on-board device 20 in the embodiment of the present invention. While FIGS. 4 and 5 illustrate the on-board device 20 that is an on-board device placed in either one of the lead vehicle and the trailing vehicle of a train, the on-board device 20*a* also has a similar configuration to the on-board device 20. The on-board device 20 and the on-board device 20*a* are connected to each other.

The on-board device 20 illustrated in FIG. 4 includes: a breaker that has a PBN (Parking Brake No-fuse-breaker) 21*a* whose contact is closed in an off-state thereof and a PBCN (Parking Brake Complementary No-fuse-breaker) 21*b* whose contact is closed in an on-state thereof, and controls supply and shut-off of an electric power from the battery 25 that is a direct-current power supply; a PBCR (Parking Brake Complementary Relay) relay 23 that turns on a PBCR contact 22 when energized with being supplied with power from the PBCN 21*b*; the PBCR contact 22 that is on/off controlled by the PBCR relay 23; the parking brake 12 that fixes the wheel 11 when the train 6 is stopped; the parking-brake controlling electromagnetic valve 14 that releases the parking brake 12 when being electrically energized, a train-information management device 50 that manages train information; the on-board control device 30 equipped with a storage unit, which can store position information of the train 6 in this storage unit, and controls an operation of the train 6 based on this position information; and a parking-brake release detecting circuit 40 that detects and stores release of the parking brake 12. The on-board control device 30 includes: a reset outputting photocoupler 32 that is electrically energized when a vehicle power supply is turned on and executes on/off control for a reset contact 47 in the parking-brake release detecting circuit 40; a brake-release-detecting-circuit inputting photocoupler 31; an on-board control unit 33 that controls traveling of a train; and a display unit 34. The train-information management device 50 includes: an inputting photocoupler 51 that monitors states of a PBN 27*a* and a PBCN 27*b* that are breakers when the vehicle power supply is on; an outputting contact 52 that controls the parking-brake controlling electromagnetic valve 14 when a voltage is applied to a vehicle; and a train-information management unit 53 that manages train information. In FIG. 5, the parking-brake controlling electromagnetic valve 14 is represented as a PBV (Parking Brake Valve). The PBN 27*a* and the PBCN 27*b* each have a contact for monitoring a state, while the train-information management device 50 monitors these states. The parking brake 12 is under control of the train-information management device 50, but when the vehicle power supply is turned off and the train-information management device 50 is turned off at the time of staying overnight of the train, the parking brake 12 is forcibly released by manually turning on the PBCN. The PBN 21*a* and the PBN 27*a* are equal to each other, and the PBCN 21*b* and the PBCN 27*b* are equal to each other.

In the present specification, a state where a voltage is applied to a relay is described as voltage application to the relay and a state where no voltage is applied to a relay is described as no voltage application. In association with these descriptions, a state where a contact side of a relay is closed is described as an "on" state and a state where the contact side is opened is described as an "off" state.

As an example, the parking-brake release detecting circuit 40 includes: a PBR (Parking Brake Relay) relay 41; PBR contacts 42 and 43 that are on/off controlled by electrical energization to the PBR relay 41; a PBRR (Parking Brake Release Relay) A relay 44 connected to the PBR contact 42 in series; a PBRR (Parking Brake Release Relay) B relay 45 connected to the PBR contact 43 in series and connected to the PBRRA relay 44 in parallel; a PBRR contact 46 that is on/off controlled by the PBRRA relay 44 and the PBRRB relay 45; and the reset contact 47 that is connected to the PBR contact 43 in series and is on/off controlled by electrical energization to a reset relay 28.

The train-information management device 50 includes the inputting photocoupler 51, the outputting contact 52, and the train-information management unit 53. The inputting photocoupler 51 monitors a state of a breaker using a power supply of the train-information management device 50. The outputting contact 52 is disposed between the PBN 21a and the parking-brake controlling electromagnetic valve 14. When the outputting contact 52 is turned on, the parking-brake controlling electromagnetic valve 14 is energized, so that the parking brake 12 can be released.

Then, when the PBCN is turned on manually, a voltage is applied to the PBCR relay by the battery 25, and the PBCR contact is closed while a vehicle power supply is off, a voltage is applied to the parking-brake controlling electromagnetic valve 14. The parking-brake release detecting circuit 40 includes first to third relays and first to fourth contacts. One end of each of the PBR relay 41 that is the first relay, the PBR contact 42 that is the first contact, and the reset contact 47 that is the second contact are connected to a wiring line 26. The PBR contact 42 that is the first contact and the PBRRA relay 44 that is the second relay are connected to each other in series. The reset contact 47 that is the second contact, the PBR contact 43 that is the third contact, and the PBRRB relay 45 that is the third relay are connected in series in this order. The PBR contact 42 that is the first contact is turned on when the PBR relay 41 that is the first relay is energized, and is turned off when the PBR relay 41 is not energized. The reset contact 47 that is the second contact is turned on when the stored contents of the parking-brake-controlling-electromagnetic-valve energization detection storage unit 16 are reset. The PBR contact 43 that is the third contact is turned off when the PBR relay 41 that is the first relay is energized, and is turned on when the PBR relay 41 is not energized. The PBRR contact 46 that is the fourth contact is turned on when the PBRRA relay 44 that is the second relay is energized, and is turned off when the PBRRB relay 45 that is the third relay is energized. When an operation of the train 6 is ended and a vehicle power supply is turned off by a manual operation of a human operator, the PBR contact 42 and the PBRR contact 46 are turned off, the PBR contact 43 is turned on, and the reset contact 47 is turned off. Thereafter, when the vehicle power supply is turned on, the on-board control unit 33 reads an on/off state of the PBRR contact 46 thereby making it possible to detect release of the parking brake 12 during a period between turning-on and turning-off of the vehicle power supply.

First, description is given for a case where release of the parking brake does not occur while a vehicle power supply is off. If a vehicle power supply is on, the train-information management device 50 and the on-board control device 30 are on. A voltage is applied to a power-supply line $V_H$ (Voltage High) of the vehicle power supply illustrated in FIG. 4. The PBCN 21b is off and the PBN 21a is on. The PBCR contact 22 is opened. While the parking brake is operated, no voltage is applied to the PBR relay 41 and the PBR contact 42 is opened. The PBR contact 43 is on. Because a voltage is applied to the power-supply line $V_H$ illustrated in FIG. 4, the reset relay 28 connected to the on-board control device 30 is electrically energized and the reset contact 47 is closed.

Then, when the vehicle power supply is turned off by a manual operation of a human operator and so the train-information management device 50 and the on-board control device 30 are turned off, no voltage is applied to the reset relay 28 and therefore the reset contact 47 is turned off. Further, since the outputting contact 52 of the train-information management device 50 also remains opened, a voltage is not applied to the PBR relay 41 and the PBRRA relay 44, and the PBRR contact 46 is maintained to be an off-state.

Thereafter, when the vehicle power supply is turned on by a manual operation of a human operator and so the train-information management device 50 and the on-board control device 30 are turned on, the on-board control unit 33 reads an on/off state of the PBRR contact 46. In a specific example, a light emitting diode is connected in a forward direction to a portion of the brake-release-detecting-circuit inputting photocoupler 31 that is connected in series to a high-voltage side of the PBRR contact 46, the portion being connected to the PBRR contact 46. By detecting whether or not light is emitted from this light emitting diode on a light-receiving side of the brake-release-detecting-circuit inputting photocoupler 31, the on-board control unit 33 reads on/off of the PBRR contact 46. Because release of the parking brake 12 has not occurred at this time, the PBRR contact 46 is off and no current flows to a light-emitting side of the brake-release-detecting-circuit inputting photocoupler 31. Therefore, a light detection signal is not detected on the light-receiving side, and the on-board control device 30 recognizes that release of the parking brake has not occurred while the vehicle power supply is off.

After reading on/off of the PBRR contact 46 in the above manner, the on-board control unit 33 energizes the reset relay 28 in the manner described later by the reset outputting photocoupler 32. When the reset relay 28 is energized, the reset contact 47 is turned on, and in a situation where the PBR contact 43 is also on due to initial setting, the PBRRB relay 45 is energized. When the PBRRB relay 45 is energized, the PBRR contact 46 is turned off.

Next, description is given for a case where release of the parking brake occurs while a vehicle power supply is off. First of all, as with the case where release of the parking brake does not occur, when the vehicle power supply is on and the train-information management device 50 and the on-board control device 30 are on, a voltage is applied to the power-supply line $V_H$ illustrated in FIG. 4. The PBCR contact 22 is kept opened unless the PBCN is turned on manually. When the vehicle power supply is on, the parking brake is controlled by the outputting contact 52 of the train-information management device 50. When the contact is closed, the PBR relay is on, the PBRRA relay is on, and the PBRR contact is closed. When the outputting contact 52 is opened, the PBR relay is on, the PBRRA relay is on, and the PBRR contact is on. When the contact is opened, the PBR relay is off, the PBRRB relay is on, and the PBRR contact is opened. Then, when the train-information management device 50 and the on-board control device 30 are turned off, the reset relay 28 is de-energized, and so the reset contact 47 is turned off and the PBRR contact 46 is maintained to have an off-state.

In order to release the parking brake while the vehicle power supply is off, it is necessary to turn on the PBCN manually. In this case, the PBCR relay is turned on and the PBCR contact is turned on. Also, the PBR relay is turned on, a voltage is applied to the PBRRA relay, and the PBRR contact is closed. In order to cancel release of the parking brake while the vehicle power supply is off, it is necessary to turn off the PBCN manually. In this case, the PBCR relay is turned off and the PBCR contact is turned off. Further in this situation, the PBR relay is turned off, but the reset contact is opened, so that a voltage is not applied to the PBRRB relay, thereby keeping a state where the PBRR contact is closed.

Thereafter, when the train-information management device 50 and the on-board control device 30 are turned on, the on-board control unit 33 reads an on/off state of the PBRR contact 46. In this example, the PBRR contact 46 is on as described above. Therefore, a current flows to the light-emitting side of the brake-release-detecting-circuit inputting photocoupler 31 to cause light emission therefrom, and the emitted light is received by the light-receiving side, thereby a light detection signal being detected on the light-receiving side, and the on-board control device 30 accordingly detecting occurrence of release of the parking brake while the vehicle power supply is off.

As described above, the on-board control unit 33 reads an on/off state of the PBRR contact 46, then causes the light-emitting side of the reset outputting photocoupler 32 to emit light, and causes the light-receiving side to receive this emitted light to bring the light-receiving side to an energized state, thereby energizing the reset relay 28. When the reset relay 28 is energized, the reset contact 47 is turned on, and in a situation where the PBR contact 43 is also on, the PBRRB relay 45 is energized. When the PBRRB relay 45 is energized, the PBRR contact 46 is turned off.

Figure 6:
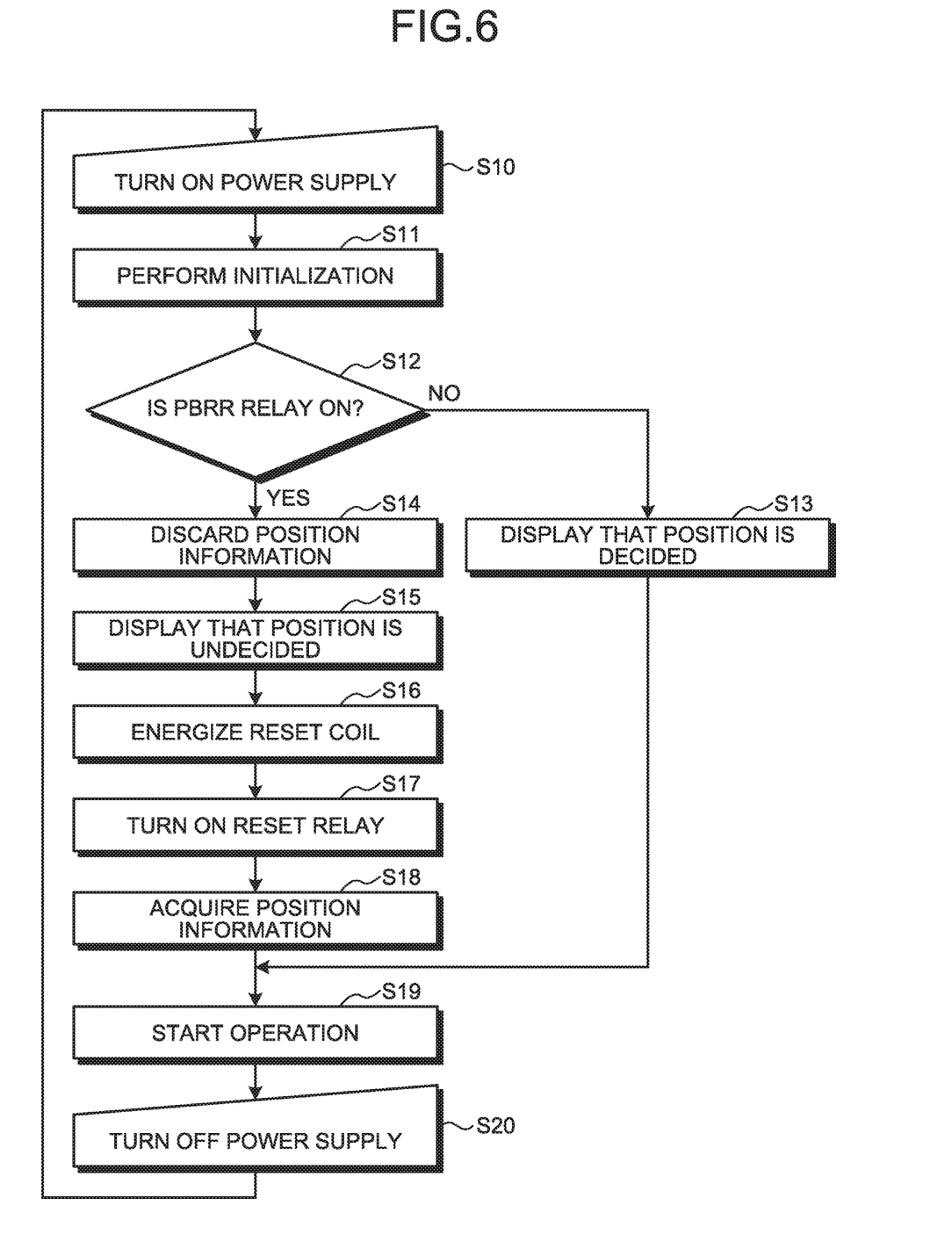
FIG. 6 is a flowchart illustrating a parking-brake release detecting operation in the present embodiment.

FIG. 6 is a flowchart illustrating a parking-brake release detecting operation in the present embodiment. First, a vehicle power supply is turned on (S10), and initialization is performed (S11). After the initialization, the on-board control device 30 determines whether or not the PBRR contact 46 is on (S12). Detection of a state of the PBRR contact 46 is realized by using a photocoupler as described above, as an example. In a case where the PBRR contact 46 is not on (NO at S12), release of the parking brake has not occurred while the vehicle power supply is off, and a train has not moved after turning-off of the on-board control device 30. Therefore, position information stored in the on-board control device 30 is accurate. Accordingly, an indication that the position has been decided is displayed on the display unit 34 of the on-board control device 30 (S13).

In a case where the PBRR contact 46 is on (YES at S12), release of the parking brake has occurred and the train has moved after turning-off of the on-board control device 30. Therefore, the position information stored in the on-board control device 30 is not accurate. Accordingly, the position information stored in the on-board control device 30 is discarded (S14), and an indication that the position is undecided is displayed on the display unit 34 of the on-board control device 30 (S15). The display unit 34 will be described later. Thereafter, the reset relay 28 is energized in the manner described above (S16), and the reset contact 47 is turned on (S17). Thereafter, the train 6 is hauled to a position of a ground element so that the on-board control device 30 acquires position information of the train 6 (S18) and an operation of the train 6 is started (S19). After the operation is ended, the train 6 is retained or stayed overnight, and the vehicle power supply is turned off by a manual operation of a human operator (S20). The process then returns to S10, and the parking-brake release detecting circuit 40 turns off the vehicle power supply at S20, and thereafter performs detection of release of the parking brake 12 again in accordance with the flow illustrated in FIG. 6 after turning-off of the vehicle power supply until the vehicle power supply is turned on by a manual operation of a human operator at S10 next time.

Figure 7:
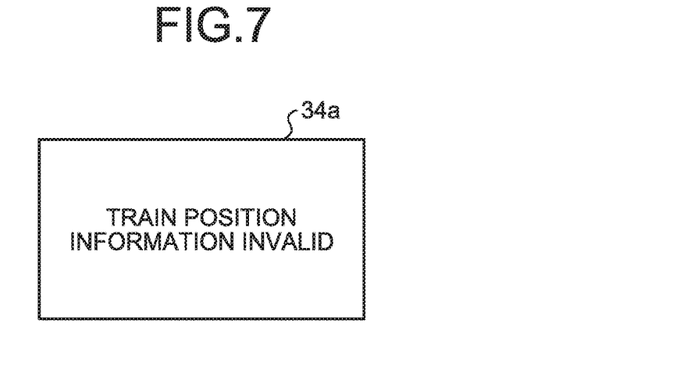
FIG. 7 is an illustration representing a screen example displayed on a display unit of an on-board control device in FIG. 6.

FIG. 7 is an illustration representing a screen example 34*a* displayed on the display unit 34 of the on-board control device 30 at S15 of FIG. 6. The screen example 34*a* illustrated in FIG. 7 indicates that train position information stored in the on-board control device 30 is invalid. Because position information of the train 6 is undecided in this state, a train radio system cannot be operated. In order to operate the train radio system, the position information is acquired again by moving the train 6 to a ground element. In general, a ground element is arranged at an exit and an entrance of a storage track used for storing the train 6. Therefore, it suffices to use this ground element for detection of accurate position information.

Figure 8:
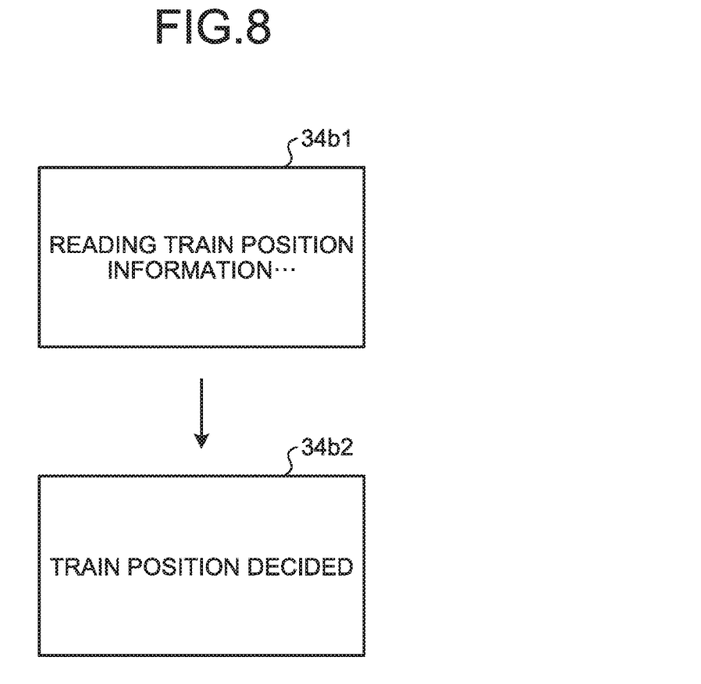
FIG. 8 is an illustration representing screen examples displayed on the display unit of the on-board control device in FIG. 6.

FIG. 8 is an illustration representing screen examples displayed on the display unit 34 of the on-board control device 30 at S13 of FIG. 6. A screen example 34*b*1 illustrated in FIG. 8 indicates that position information is being read, and a screen example 34*b*2 subsequent thereto indicates that a train position has been decided. Because the train position has been decided in this state, the train radio system can be operated. In this manner, when the battery 25 is turned on while the PBRR contact 46 that is the fourth contact is kept on, an indication that position information is invalid is displayed by the on-board control unit 33.

Figure 9:
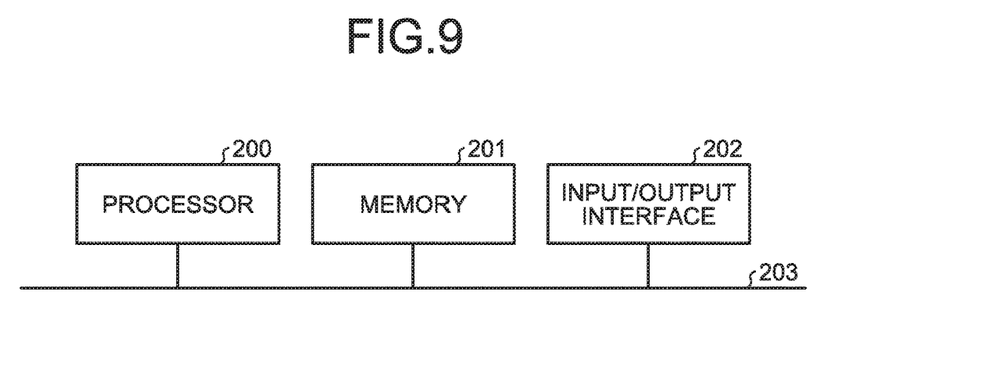
FIG. 9 is a diagram illustrating a general configuration of hardware for implementing an on-board control unit of the on-board control device in the embodiment.

The on-board control unit 33 of the on-board control device 30 includes at least a processor, a memory, and an input/output interface, and an operation thereof can be realized by software. FIG. 9 is a diagram illustrating a general configuration of hardware for implementing these devices. A device illustrated in FIG. 9 includes a processor 200, a memory 201, and an input/output interface 202 that are connected to one another via a bus 203. The processor 200 performs calculation and executes control based on software using input data. The memory 201 stores therein the input data or data required for calculation and control of the processor 200. The input/output interface 202 receives at least signals from the brake-release-detecting-circuit inputting photocoupler 31 and the reset outputting photocoupler 32, and transmits display-screen data generated by the processor 200 to the display unit 34. Modification may be made to have two or more processors each corresponding to the processor 200 and have two or more memories each corresponding to the memory 201. The train-information management unit 53 can be also realized by the configuration including a processor, a memory, and an input/output interface, similarly to the on-board control unit 33.

As described above, according to the present embodiment, the on-board control unit 33 can detect whether release of the parking brake 12 has occurred while a vehicle power supply is off, by reading a state of the PBRR contact 46 in the parking-brake-controlling-electromagnetic-valve energization detection storage unit 16 when the vehicle power supply is turned on. Therefore, each of the on-board devices 20 and 20*a* on the train 6 can determine whether or not train position information stored in the on-board device 20 or 20*a* is accurate. So, the on-board devices can control an operation of the train 6 in such a manner that the operation of the a train radio system is started in a case where the train position information is accurate, and is not started in a case where the train position information is not accurate.

According to the present embodiment, facilities can be more simplified than in a method in which a train ID oscillator equipped in a train and a ground ID detecting device constantly perform communication with each other to update position information as in a conventional technique. Therefore, it is possible to detect movement of a train in a state where a vehicle power supply is off, while suppressing an increase in cost. Further, because communication is not constantly performed, power consumption of a battery can be minimized. Therefore, a battery capacity can be made smaller.

The present invention is not limited to the configuration described in the present embodiment, but can be applied to any configuration capable of detecting an operation of a component part for controlling a parking brake and retaining a detection result that the parking brake has been turned off by the component part controlling this parking brake even when a power supply is off.

In the present embodiment, a storage track in a station can be exemplified as a place for storing a train, but this is an example without limitation. The entire section in which a train is controlled by the train radio system can be used as the place where a train is to be stored.

According to the present embodiment, it is possible to detect whether or not release of a parking brake has occurred. Therefore, the embodiment can ensure that movement due to wandering or rolling motion of a train that has been retained or stayed overnight has not occurred, so that safety can be improved.

The configurations described in the above embodiment are only examples of the content of the present invention. The said configurations can be combined with other publicly known techniques, and partially omitted and/or modified without departing from the scope of the present invention.

REFERENCE SIGNS LIST 1 on-rail train management device; 2 train radio system network; 3A, 3B, 3C, 3D ground control device; 4A, 4B, 4C, 4D base network; 5a, 5b, 5c, 5d, 5e, 5f, 5g, 5h radio base station; 6 train; 6A, 6B vehicle; track; 8a, 8b, 8c, 8d, 8e, 8f ground element; 10, 40 parking-brake release detecting circuit; 11 wheel; 12 parking brake; 14 parking-brake controlling electromagnetic valve; 15 parking-brake-controlling-electromagnetic-valve energization detecting unit; 16 parking-brake-controlling-electromagnetic-valve energization detection storage unit; 20, 20a on-board device; 21a, 27a PBN; 21b, 27b PBCN; 22 PBCR contact; 23 PBCR relay; 25 battery; 26 wiring line; 28 reset relay; 30 on-board control device; 31 photocoupler for brake release detecting circuit input; 32 reset outputting photocoupler; 33 on-board control unit; 34 display unit; 34a, 34b1, 34b2 screen example; 41 PBR relay; 42, 43 PBR contact; 44 PBRRA relay; 45 PBRRB relay; 46 PBRR contact; 47 reset contact; 50 train-information management device; 51 inputting photocoupler; 52 outputting contact; 53 train-information management unit; 100 train radio system; 200 processor; 201 memory; 202 input/output interface; 203 bus.

The invention claimed is:

1. An on-board device that is equipped in a train having a battery capable of supplying electric power when a vehicle power supply is off, a parking brake to fix a wheel when the train is stopped, and a parking-brake controlling electromagnetic valve to be energized by power supplied from the battery when the parking brake is released, and that retains position information of the train stored when the vehicle power supply is on, even when the vehicle power supply is off, the on-board device comprising a parking-brake release detecting circuit that includes:
   a parking-brake-controlling-electromagnetic-valve energization detection unit to detect energization to the parking-brake controlling electromagnetic valve when the vehicle power supply is off; and
   a parking-brake-controlling-electromagnetic-valve energization detection storage unit to store therein a result of detection until stored contents are reset.

2. The on-board device according to claim 1, wherein
   one end of the parking-brake controlling electromagnetic valve is connected to a wiring line that serves as a path of power from the battery when the parking brake is released while the vehicle power supply is off,
   the parking-brake release detecting circuit includes first to third relays and first to fourth contacts,
   one end of each of the first relay, the first contact, and the second contact are connected to the wiring line,
   the first contact and the second relay are connected to each other in series,
   the second contact, the third contact, and the third relay are connected in series in this order,
   the first contact is turned on when the first relay is energized, and is turned off when the first relay is not energized,
   the second contact is turned on when stored contents of the parking-brake-controlling-electromagnetic-valve energization detection storage unit are reset,
   the third contact is turned off when the first relay is energized, and is turned on when the first relay is not energized, and
   the fourth contact is turned on when the second relay is energized, and is turned off when the third relay is energized.

3. A display device equipped in an on-board control device included in the on-board device according to claim 2, on which an indication that the position information is invalid is displayed when the vehicle power supply is turned on while the fourth contact is in an on-state.

4. A method for detecting parking brake release using the parking-brake release detecting circuit included in the on-board device according to claim 2, the method comprising:
   a step of supplying power to a wiring line that serves as a path of power from the battery and energizing the first relay when the parking brake is released while the vehicle power supply is off;
   a step of turning on the first contact and turning off the third contact by energization of the first relay;
   a step of turning on the fourth contact by energization of the second relay, and maintaining an on-state of the fourth contact until the third relay is energized; and
   a step of turning off the fourth contact by energization of the third relay caused by turning on of the second contact.

* * * * *